Patented June 3, 1924.

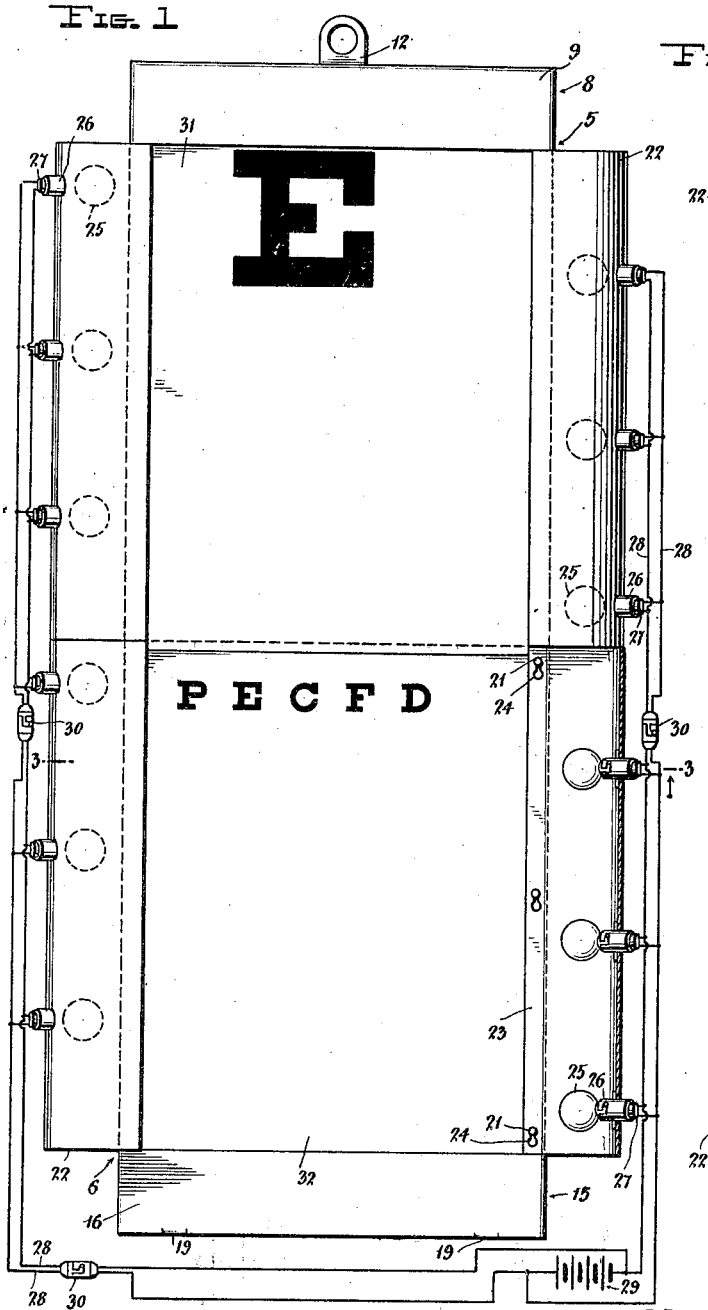

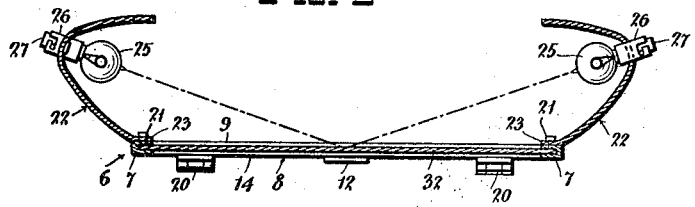
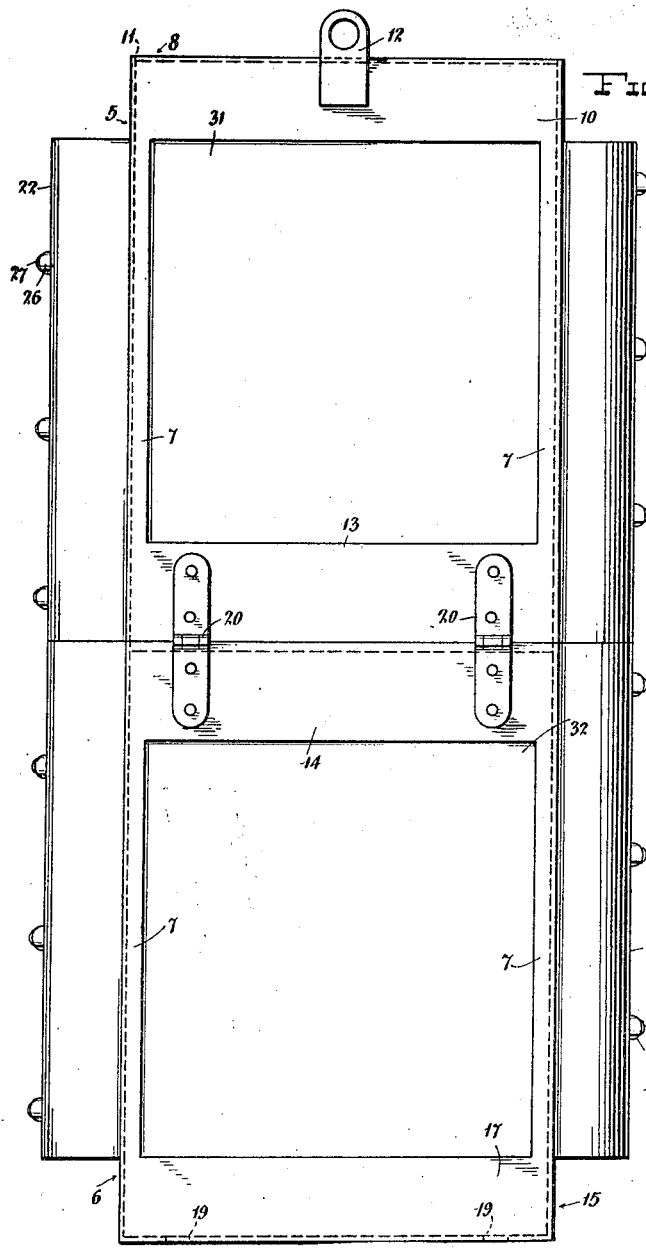
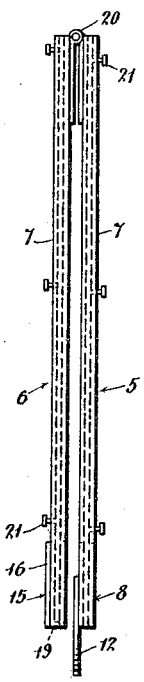

1,496,681

UNITED STATES PATENT OFFICE.

MARY GERTRUDE SLAUGHTER, OF HAGERSTOWN, MARYLAND.

PORTABLE EYE-TESTING-CHART HOLDER.

Application filed May 19, 1923. Serial No. 640,151.

*To all whom it may concern:*

Be it known that I, MARY GERTRUDE SLAUGHTER, a citizen of the United States, residing at Hagerstown, in the county of Washington and State of Maryland, have invented new and useful Improvements in Portable Eye-Testing-Chart Holders, of which the following is a specification.

This invention relates to an eye testing chart holder adapted particularly for ascertaining the correctness or deficiencies of vision of school children or pupils but also generally serviceable for eye testing of adults.

An object of the invention is the provision of an eye testing chart holder that may be readily reduced to compact form and carried or transported in a suitable enclosure from one place to another in condition for expeditious assemblage of the several parts thereof for practical service. A further object is to provide an eye testing chart holder having light reflecting and diffusing means in such opposed relation to the chart surface that the letters, words, characters or symbols on the face of the chart may be readily discernible and displayed with such effectiveness as to insure a visual concentration of the eyes of the patient tested at the usual standardized distances, with a resultant accuracy in determining with certainty the visual inaccuracies or defects of the eyes tested. A still further object of the invention is to provide an eye testing chart holder of a strong and durable character and simplified structure that will positively hold an eye testing chart or chart members therein in position for determining and diagnosing normal and abnormal conditions of the eyes tested, and to have the light carrying, reflecting and diffusing means so positioned as to be capable of easy inclusion in electrical circuit with a source of electrical current and to so dispose the light producing means as to equally illuminate the entire chart surface without the least cast shadow or blur of any part of the chart surface.

With these and other objects and advantages in view, and which will be pointed out in the subjoined description, the invention consists in the preferred construction and arrangement of the several parts which will be more fully hereinafter described and claimed.

In the drawings:

Fig. 1 is a front elevation of a chart embodying the features of the invention and showing a portion thereof in section;

Fig. 2 is a longitudinal vertical section of the improved holder taken through the center thereof;

Fig. 3 is a transverse vertical section on the line 3—3, Fig. 1;

Fig. 4 is a rear side elevation of the holder; and

Fig. 5 is an edge elevation showing the parts of the holder folded in compact form and the light reflecting and diffusing means detached.

The improved eye testing chart holder comprises generally two sections or members 5 and 6 each having side guards 7 of substantially U-shaped form and opening inwardly and closed at their outer edges as shown by Fig. 3. The side guards 7 of the section or member 5 are connected by a top cross guide 8 consisting of two cross strips 9 and 10 in parallel relation and having an opening 11 between them at their upper ends, as shown by Fig. 2, a hanger or suspending means 12 being attached to the center of the said cross guide 10. The lower extremities of the side guards 7 of the section 5 are connected by a rear transverse tie strip 13, and the upper extremities of the side guards of the lower section 6 are connected by a similar transverse tie strip 14. The lower extremities of the side guards 7 of the lower section or member 6 are secured to, or continuous with, a lower transverse socket 15 comprising front and rear strips 16 which are spaced apart in parallel relation and have an unobstructed opening 18 between the upper edges thereof, angular flanges or retaining projections 19 extending from the cross strip 16 to the cross strip 17, to provide stops at the bottom of the socket 15. The tie strips 13 and 14 have rear hinges 20 secured thereto, the said hinges being of any form adapted for the purpose and are shown as of the strap type. By means of the hinges the two sections or members 5 and 6 are given a connected folding association, so as to reduce the length of the chart for transportation purposes. At regular intervals along the front side members of the side guards 7 of the two sections or members 5 headed studs 21 are secured in predetermined spaced relation for separable engagement therewith of light carrying and reflecting and diffusing devices 22. There are four of these light carrying and reflecting and diffusing devices 22, one for each side of the sections or members 5 and 6, and all of the said devices 22 are of similar construction and each has a flattened attaching flange 23 formed with a plurality of key-hole slots 24, as shown by Fig. 1, to engage the headed studs 21 and separably secure the devices in connection with the front sides of the guides 7. From the flattened attaching flange 23 of each device 22, the latter is shaped to produce a parabolic curvature thereof and the inner curved side of the device 22 has a reflecting surface similar to the usual form of reflectors or lighting devices in which the lighting means have mounting. In the present instance the lighting means are shown in the form of incandescent electric bulbs 25 having sockets 26 extended through the reduced portion of the parabolic curve at rearward and inward angles of inclination towards the backs of the two sections or members 5 and 6, all of the sockets 26 and bulbs 25 having a uniform inclination, or are similarly disposed in each device 22. The sockets 26 and bulbs 25 are disposed in longitudinal alinement and extend throughout the length of the reflecting and diffusing devices 22, so that the light will be equally deflected or diffused over the entire surface of each of the chart sections or members. The lighting means or bulbs 25 in the opposing devices 22 are so arranged that they will be in transverse alinement with the spaces between the bulbs, or, for instance, if there be three of the electric bulbs in the lighting devices at the right of the section 5 as shown, the bulbs in the opposing devices at the left of the said section will be shifted as a whole nearer the upper edge of the left lighting device and directly opposite the spaces between the bulbs in the right lighting device. This arrangement of the bulbs or lighting means is also similarly carried out in the lighting devices separably connected to the opposite sides of the section or member 6. All of the sockets 26 of the electric bulbs or lighting means 25 are engaged by the usual form of plugs 27 and these plugs in turn are electrically connected by suitable circuit wires 28 with a battery 29 or other source of electrical current. At intervals the circuit wires 28 will have coupling plugs and sockets 30, so that they may be separated when it is desired to collapse or reduce the improved eye testing chart holder to compact form. The plugs 27 may remain in engagement with the sockets 26, and with the light carriers or light reflecting and diffusing devices 22 may be readily removed from the guides 7 and remain intact for expeditious reapplication to the said guides. However, the separation and attachment of the electric circuit wires 28 and sockets 27 may be modified in accordance with conditions that may be present and the exact course of procedure in connecting up the electric lighting means or bulbs 25 is non-essential as far as the features of the invention are concerned. Moreover, it will be understood that the electric lighting means or other lighting source may be modified at will but in all lighting attachments care will be taken to obtain the best light reflecting and diffusing results and to wholly conceal the lighting means themselves within the reflecting and diffusing devices 22, so that the eyes of the patient tested will not be strained or the vision diverted from the test chart.

The test chart in this instance is preferably composed of two sections 31 and 32 which consist of a single chart transversely cut at about the central portion thereof, so as to permit the chart sections 31 and 32 to remain in the guides 7 and be folded inwardly, as shown by Fig. 5, during storage and transportation of the improved holder. When the improved test chart is opened for use, the sections 31 and 32 are regularly alined and the cut edges thereof closely coincide so as not to make any break or noticeable irregularity in the surface of the chart, the two sections becoming practically one sheet. In applying the chart sections 31 and 32 to the improved holder, the lower section 32 is inserted through the opening 11 at the top of the holder section or member 5 and pushed through the side guides 7 of the latter section downwardly into and through the guides 7 of the lower section 6 and fully into the socket 15 at the bottom of the said section 6. After the lower chart section 32 has been placed in position, the upper section 31 is then similarly inserted in the opening 11 at the top of the holder section or member 5 and pushed downwardly through the side guides 7 of the upper section or member until the lower end edge of the chart section 31 engages the upper end edge of the chart section 32. The front face or side of the chart sections 31 and 32 will be provided with the usual letters, characters, symbols and color bars ordinarily applied to standardized eye testing charts and in the same graduated sequence as to size and with distance indications and other directing mediums along one side of each of the chart sections.

Where the eye test is made in suburban districts or localities where there is no source of electric current supply, it is proposed to connect the circuit wires to a battery that may form part of an automobile or be a special equipment feature of the latter. When the improved holder and test chart carried thereby are used in places where electric current supply is readily available, the circuit wires may be connected to the source of supply by any of the well known means.

It is proposed to preferably form the parts of the holder, including the light carrying and reflecting and diffusing devices 22, of metal which may be of a non-corrosive character but will be preferably of a color best adapted to the use of the chart. As hereinbefore indicated, the holder may be reduced to compact form by detaching the light carrying and reflecting and diffusing devices 22 therefrom by shifting the latter devices longitudinally to bring the headed studs 21 in line with the enlarged portions of the key-hole slots 24, it being understood that the device 22 of the holder section or member 5 will be first detached and then the same device 22 of the section or member 6. After the sections or members 22 are removed, the two sections 5 and 6 may be folded as shown by Fig. 5 and with the devices 22 and electrical attachments inserted in a suitable enclosure such as a brief bag or similar device adapted for the purpose. When it is desired to use the holder, it may be readily unfolded and the devices 22 applied and the circuit wires connected and attached to a source of electrical current to cause the electric bulbs or lighting means 25 to glow. The angle of the electric bulbs or lighting means is such that the axes thereof will be in alinement with the center of the top sections 31 and 32, as indicated by dotted lines in Fig. 3, and owing to the alternate or staggered arrangement of the lighting devices at opposite sides of the chart sections, the light rays will be equally reflected and diffused over the chart surface. Moreover, it will be seen that the outer unattached portions of the devices 22 overhang and conceal the lighting means or electric bulbs, and the said outer portions of the devices 22 terminate in alinement with the inner edges of the flat attaching flanges 23 so as not to intercept the vision of the eye tested relatively to the full width of the chart sections. It is to be understood that, when using the holder and the chart carried thereby, the same will be suspended from suitable means at a proper elevation to give the best results.

It will also be understood that changes in the proportions, dimensions and minor details of the several parts of the holder may be adopted without departing from the spirit of the invention.

What is claimed as new is:

1. An eye testing chart holder, comprising frame sections with inner connected ends and flat backs provided with means for removably holding chart sections therein and permitting said sections to be readily inserted and withdrawn from the frame sections, light reflecting and diffusing devices removably applied solely to opposite sides of the frame sections and disposed in longitudinal alinement and having their inner ends adjacent to the connected ends of the frame sections in close contact engagement when the frame sections are fully opened, and lighting means arranged along and within the said light-reflecting and diffusing devices to throw rays of light equally in reverse lateral directions to fully illuminate the flat chart section surfaces.

2. An eye testing chart holder comprising folding frame sections having means for removably holding chart sections therein in flat condition and in joined alinement, light reflecting and diffusing means removably applied to opposite sides and extending full length of the frame sections, and lighting means in the said reflecting and diffusing means and longitudinally disposed throughout the full length of the frame sections and alternately arranged at opposite sides of each frame section so as to throw light rays fully over the flat surfaces of the chart sections with equal intensity.

3. An eye testing chart holder comprising frame sections of similar dimensions connected by hinges at their inner ends for disposition in longitudinal alinement and also for folding in compact form, the said frame sections being provided with means for removably holding chart sections in flat condition therein and permitting the ends of the chart sections to join adjacent the hinge connection of the frame sections to practically form a continuous chart, light reflecting and diffusing devices removably applied solely along opposite sides of the frame sections, and lighting means held and arranged regularly along and spaced regular distances apart within the light reflecting and diffusing devices for equally throwing light rays over the entire chart surface solely from opposite sides of the holder.

4. An eye testing chart holder comprising folding frame sections having flat intermediate connecting hinges and guide means for removably receiving chart sections in flat condition and permitting ends of said chart sections to contact and provide a substantially continuous chart, and light reflecting and diffusing devices removably applied to opposite sides of the frame sections and constructed to throw light rays inwardly and rearwardly towards the chart surfaces and backs of the frame sections and carrying lighting devices in longitudinal arrangement therealong, the lighting devices being disposed at inward and rearward angles of inclination and those at one side being in alinement with the spaces between those of the opposite side of each frame section.

5. An eye testing chart holder comprising frame sections provided with means for removably receiving and holding chart means therein in flat condition and for endwise engagement to produce a substantially continuous chart, and light reflecting and diffusing devices removably applied to and longitudinally disposed at opposite sides of the frame sections and having lighting means held in longitudinal alinement therein and disposed at rearward and inward angles of inclination towards the chart means and backs of the frame sections, the lighting means being detachable and fully concealed from front view within the said reflecting and diffusing devices.

6. An eye testing chart holder comprising frame sections provided with means for removably receiving and supporting chart means, and light reflecting and diffusing devices removably applied to opposite sides of the frame sections and having lighting means held therein and disposed at rearward and inward angles of inclination relatively to the chart means, the lighting means being disposed in alternation at opposite sides of the frame sections to locate the lighting means on one side in alinement with the spaces between the lighting means on the opposite side.

7. An eye testing chart holder comprising foldable frame sections provided with means for removably receiving chart means, the one frame section having an end socket to limit the movement of the chart means in relation thereto, and light reflecting and diffusing means removably applied to opposite sides of the frame sections and having lighting devices disposed therein in alternate locations at opposite sides of the reflecting and diffusing means to bring the lighting devices on one side in transverse alinement with the spaces between the lighting devices at the opposite side.

8. An eye testing chart holder comprising folding sections having ends thereof connected for reducing the extent of the same and provided with guides for holding chart sections therein and retaining the said chart sections in flat condition with ends abutting to practically provide a continuous chart, and light reflecting and diffusing means disposed at opposite sides of the frame sections to cast rays of light inwardly and rearwardly over the full surfaces of the chart sections.

9. An eye testing chart holder comprising foldable frame sections of equal dimensions having their inner ends closely abutting and connected by hinges and provided with means for holding chart sections and permitting the ends of the said latter sections to abut to produce a practically continuous chart, light reflecting and diffusing means disposed solely at opposite sides of the frame sections and having their inner ends arranged to abut when the said frame sections are opened, the front of the frame sections between the light reflecting and diffusing means being fully open to give the chart sections a maximum exposure, and lighting devices arranged along and within the light reflecting and diffusing means in longitudinal alinement and at an angle of inclination towards the backs of the sections to throw the light rays inwardly over the entire surfaces of the chart sections, the lighting devices being concealed from view at the front of the holder.

In testimony whereof I have hereunto set my hand.

MARY GERTRUDE SLAUGHTER.